US012172090B2

(12) United States Patent
Jolly

(10) Patent No.: US 12,172,090 B2
(45) Date of Patent: Dec. 24, 2024

(54) GAME CONTROLLER HANDLES

(71) Applicant: Davis Allen Jolly, Mooresville, NC (US)

(72) Inventor: Davis Allen Jolly, Mooresville, NC (US)

( * ) Notice: Subject to any disclaimer, the term of this patent is extended or adjusted under 35 U.S.C. 154(b) by 259 days.

(21) Appl. No.: 17/719,521

(22) Filed: Apr. 13, 2022

(65) Prior Publication Data
US 2023/0330546 A1  Oct. 19, 2023

(51) Int. Cl.
*A63F 13/98* (2014.01)
*A63F 13/24* (2014.01)

(52) U.S. Cl.
CPC ............. *A63F 13/98* (2014.09); *A63F 13/24* (2014.09); *A63F 2300/1043* (2013.01)

(58) Field of Classification Search
CPC ........... A63F 13/24; A63F 13/90; A63F 13/98
See application file for complete search history.

(56) References Cited

U.S. PATENT DOCUMENTS

| | | | | | |
|---|---|---|---|---|---|
| 5,046,739 | A | * | 9/1991 | Reichow | A63F 13/02 273/148 B |
| D338,053 | S | * | 8/1993 | Underhill | D14/454 |
| 5,501,458 | A | * | 3/1996 | Mallory | A63F 13/98 273/DIG. 30 |
| D396,495 | S | * | 7/1998 | Hirokane | D21/385 |
| 6,120,025 | A | * | 9/2000 | Hughes, IV | A63F 13/98 273/148 B |
| 6,164,853 | A | * | 12/2000 | Foote | G06F 15/0225 400/489 |
| 6,241,247 | B1 | * | 6/2001 | Sternberg | A63F 13/24 273/148 B |
| 6,710,766 | B1 | * | 3/2004 | Ogata | A63F 13/24 345/169 |
| D521,567 | S | * | 5/2006 | Svendsen | D14/401 |
| D540,881 | S | * | 4/2007 | Waugh | D21/333 |
| 7,762,553 | B2 | * | 7/2010 | Harris | A63F 13/20 D21/333 |
| D624,601 | S | * | 9/2010 | Grossman | D14/218 |
| D638,017 | S | * | 5/2011 | Ortiz | D14/401 |

(Continued)

FOREIGN PATENT DOCUMENTS

AU    2017100176 A4 *  5/2017
CA       2326097    *  3/1999

OTHER PUBLICATIONS https://www.gamingcobra.com/products/playvital-pine-green-anti-skid-sweat-absorbent-controller-grip-for-playstation-5-controller-professional-textured-soft-rubber-pads-handle-grips-for-dualsence-ps5-controller-pfpj007.

*Primary Examiner* — Chase E Leichliter

(57) ABSTRACT

An article of manufacture for providing game controller removable handles according to the present invention is a pair of removable handles in which each of the two the removable handles include a left removable handle and a right removable handle. Each of the two removable handles have an inner surface having a wider inner edge and a narrower inner edge, an outer surface having a wider outer edge and a narrower outer edge, and a plurality of raised ridges positioned along the outer surface, each of the raised ridges are oriented across the wider outer edge of the outer surface and separated by a distance sufficient to permit fingers to rest between the raised ridges when held. A set of concave grooves are positioned between each pair of the raised ridges to create finger locations when the handles are attached to a game controller in use.

3 Claims, 6 Drawing Sheets

(56) References Cited

U.S. PATENT DOCUMENTS

| | | | | |
|---|---|---|---|---|
| D640,696 S | * | 6/2011 | Lovoi | D14/401 |
| D640,697 S | * | 6/2011 | Lovoi | D14/401 |
| D641,022 S | * | 7/2011 | Dodo | D14/401 |
| D666,250 S | * | 8/2012 | Fulghum | D21/333 |
| 8,740,708 B2 | * | 6/2014 | Karacal | A63F 13/245 |
| | | | | 463/47 |
| D808,466 S | * | 1/2018 | Foster | D14/401 |
| 10,201,747 B2 | * | 2/2019 | Mistry | A63F 13/24 |
| D870,207 S | * | 12/2019 | Ali | D21/333 |
| 10,671,119 B2 | * | 6/2020 | Ohtaka | G06F 1/1626 |
| 10,744,406 B2 | * | 8/2020 | Ham | G06F 3/033 |
| D900,225 S | * | 10/2020 | Morris | D21/333 |
| 10,974,156 B2 | * | 4/2021 | Fletcher | A63F 13/98 |
| 11,752,440 B2 | * | 9/2023 | Braiman | A63F 13/98 |
| | | | | 463/47 |
| 2002/0010020 A1 | * | 1/2002 | Johnson | A63F 13/98 |
| | | | | 463/47 |
| 2002/0180148 A1 | * | 12/2002 | Koziel | A63F 13/24 |
| | | | | 273/148 B |
| 2005/0075172 A1 | * | 4/2005 | Coleman | A63F 13/98 |
| | | | | 463/47 |
| 2005/0269769 A1 | * | 12/2005 | Naghi | A63F 13/24 |
| | | | | 463/36 |
| 2005/0275165 A1 | * | 12/2005 | Hussaini | A63F 13/24 |
| | | | | 273/148 B |
| 2006/0178211 A1 | * | 8/2006 | Chien | A63F 13/24 |
| | | | | 341/20 |
| 2006/0279039 A1 | * | 12/2006 | Krieger | A63F 13/98 |
| | | | | 463/36 |
| 2006/0282937 A1 | * | 12/2006 | Morris | A41D 13/081 |
| | | | | 2/163 |
| 2008/0122173 A1 | * | 5/2008 | Harris | A63F 13/20 |
| | | | | 273/148 B |
| 2013/0161121 A1 | * | 6/2013 | Hakansson | A61F 11/08 |
| | | | | 181/135 |
| 2017/0189800 A1 | * | 7/2017 | Crain | A63F 13/24 |
| 2018/0154252 A1 | * | 6/2018 | Mistry | A63F 13/24 |
| 2018/0193732 A1 | * | 7/2018 | Kamata | A63F 13/428 |
| 2018/0207523 A1 | * | 7/2018 | Lyden | A63F 13/214 |
| 2019/0054382 A1 | * | 2/2019 | Morris | B32B 25/16 |
| 2019/0351336 A1 | * | 11/2019 | Fletcher | A63F 13/98 |
| 2020/0069995 A1 | * | 3/2020 | Zelazny | A63B 21/4035 |
| 2020/0275716 A1 | * | 9/2020 | Salvatori | A41D 19/0072 |
| 2022/0062756 A1 | * | 3/2022 | Lyden | A63F 13/218 |
| 2022/0280878 A1 | * | 9/2022 | Braiman | A63F 13/98 |
| 2023/0330546 A1 | * | 10/2023 | Jolly | A63F 13/98 |

* cited by examiner

GAME CONTROLLER HANDLES

TECHNICAL FIELD

This application relates in general to an article of manufacture for providing a gaming device, and more specifically, to an article of manufacture for providing game controller removable handles.

BACKGROUND

Video game controllers typically are available for use in only one size. The devices are made to provide a positive gaming experience to a large part of game players and have been made to fit comfortably within the hands of an average user. People with larger hands may struggle to be able to comfortably grip the controller and hold it in a position that makes interacting with the various input controls on the controller challenging. Creating a completely new controller that is larger in size is a complicated and expensive approach to address this shortcoming of existing game controllers. If the sides of the controller could be enlarged and contoured to match the larger hand without affecting the operation of the controller, these users would enjoy an improved gaming experience. Therefore, a need exists for an article of manufacture for providing game controller removable handles. The present invention attempts to address the limitations and deficiencies in prior solutions according to the principles and example embodiments disclosed herein.

SUMMARY

In accordance with the present invention, the above and other problems are solved by providing an article of manufacture for game controller removable handles according to the principles and example embodiments disclosed herein.

In one embodiment, the present invention is an article of manufacture for providing game controller removable handles. A pair of removable handles in which each of the two the removable handles include a left removable handle and a right removable handle. Each of the two removable handles have an inner surface having a wider inner edge and a narrower inner edge, an outer surface having a wider outer edge and a narrower outer edge, and a plurality of raised ridges positioned along the outer surface, each of the raised ridges are oriented across the wider outer edge of the outer surface and separated by a distance sufficient to permit fingers to rest between the raised ridges when held.

In another aspect of the present invention, each of the two removable handles further includes a set of finger grooves between each pair of the plurality of raised ridges oriented parallel to the raised ridges and a curved outer rim separating the outer surface from the inner surface and being configured to restrain movement of the removable handles when coupled into a game controller.

In another aspect of the present invention, the set of finger grooves correspond to a set of concave grooves are positioned between each pair of the raised ridges to create finger locations when the handles are attached to a game controller in use.

In another aspect of the present invention, the left removable handle and the right movable handle are mirror images of each other.

In another aspect of the present invention, the pair of removable handles are made of a flexible material.

In another aspect of the present invention, the flexible material is silicone.

In another aspect of the present invention, the left removable handle is marked along the inner surface with a first character indicating the left removable handle and the right removable handle is marked along the inner surface with a second character indicating the left removable handle.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
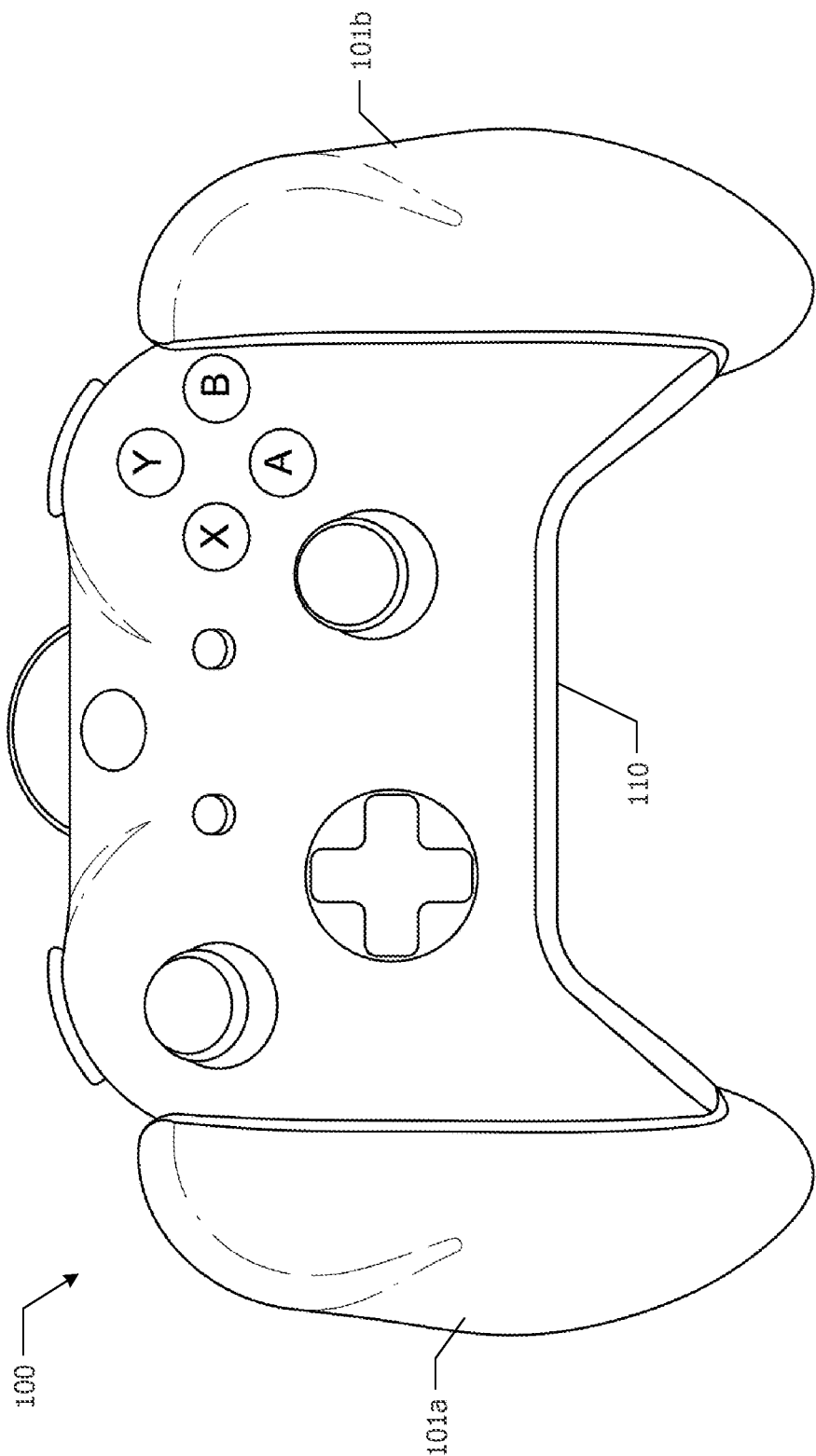
FIG. 1 illustrates an example embodiment of an article of manufacture providing game controller removable handles according to the present invention.

This application relates in general to an article of manufacture for providing a gaming device, and more specifically, to an article of manufacture providing game controller removable handles according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience.

However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing game controller removable handles according to the present invention. The term user herein refers to one or more users.

The term "invention" or "present invention" refers to the invention being applied for via the patent application with the title "Game Controller Handles." Invention may be used interchangeably with handles.

In general, the present disclosure relates to an article of manufacture providing game controller removable handles according to the present invention. To better understand the present invention, FIG. 1 illustrates an example embodiment of an article of manufacture providing game controller removable handles according to the present invention. An improved game controller 100 consists of an ordinary gaming controller 110 with a pair of removable handles 101a-b attached to the sides of the controller 110. The removable handles 101a-b are configured to easily slide onto and off of the side protrusions of existing gaming controllers 110.

The removable handles 101a-b may be constructed from many materials such as rubber, plastic, synthetics, and similar materials to provide a firm and comfortable grip to the sides of the gaming controller 110. The removable handles 101a-b may be made of a hard material that is covered with a softer layer to provide a softer feel to a user's hands. The removable handles 101a-b also may be made of a semi-flexible material that provides a comfortable feel and texture while remaining rigid enough to maintain its shape while in use.

The removable handles 101a-b may be made using a typical molding process that permits the chosen material to be formed into a desired shape while having the desired feel and texture. The removable handles 101a-b may be made using other manufacturing techniques such as digital printing. The removable handles 101a-b may be made of different colors and appearances that may include markings, logos, and the like.

Figure 2:
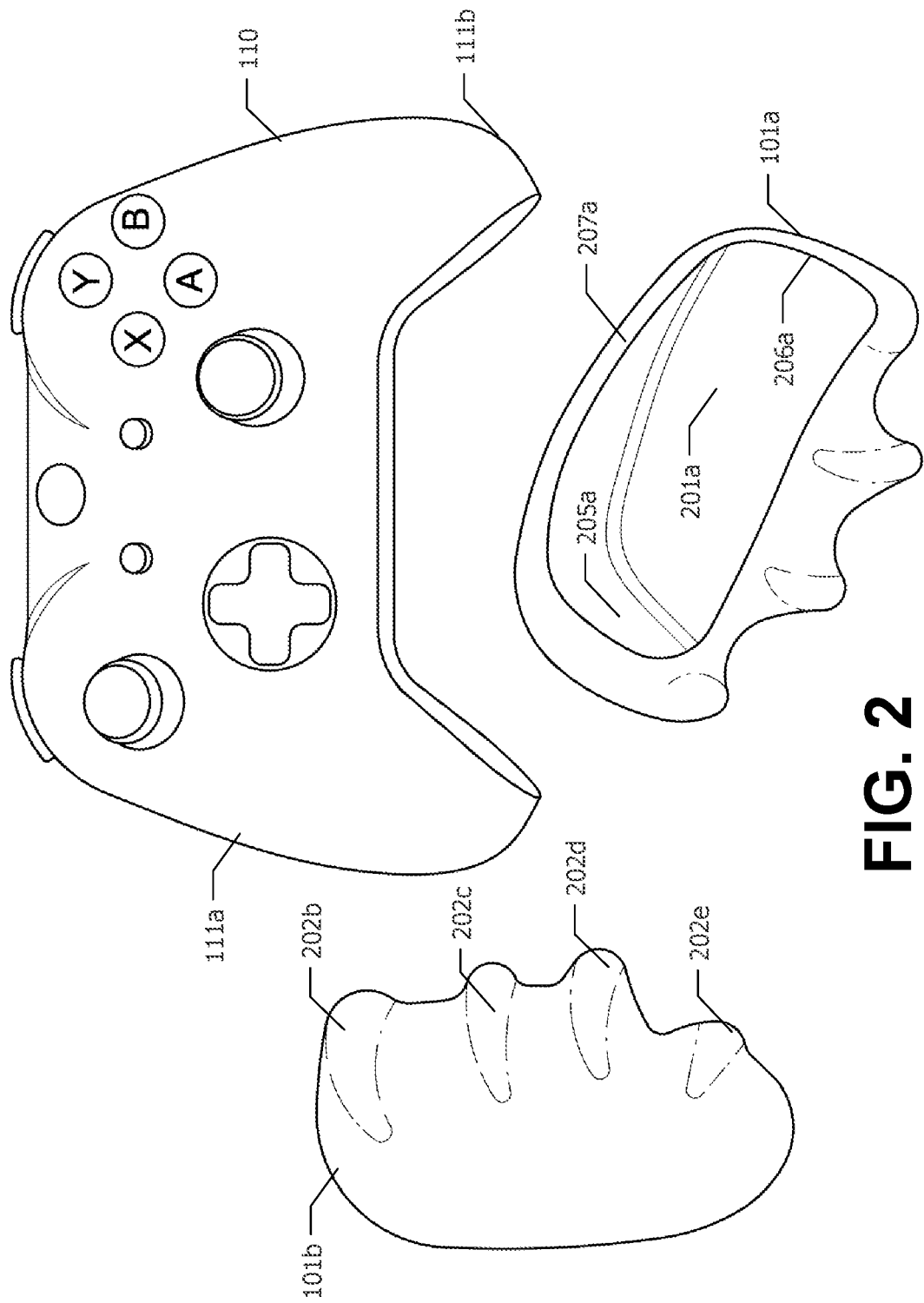
FIG. 2 illustrates another view of the example embodiment of an article of manufacture providing game controller removable handles according to the present invention.

FIG. 2 illustrates another view of the example embodiment of an article of manufacture providing game controller removable handles according to the present invention. The removable handles 101a-b comprise a pair of similar devices that are shaped as mirror images of each other allowing them to be coupled to game controller handles 111a-b. The inner surface 201a-b of each of the removable handles 101a-b is configured to match the shape of the game controller handles 111a-b. The inner surface 201a-b of the removable handles 101a-b comprises a wider end 205a-b and a narrower end 206a-b in which the narrower end 206a-b is placed along an outer end of each gaming controller handle 111a-b with the wider end 205a-b engaging the outer end of the gaming controller handle 111a-b.

The inner surface 201a-b of the removable handles 101a-b have an outer rim 207a-b that is slightly smaller than the inner surface 201a-b to allow the outer rim 207a-b to wrap around and hold against the gaming controller handles 101a-b. The removable handles 101a-b may be slid onto the gaming controller handles 111a-b until the handles are engaging the wider end 205a-b of the inner surface 201a-b. The user may remove the removable handles 101a-b by pulling the outer rim 207a-b away from the gaming controller handles 111a-n and sliding the removable handles 101a-b off of the gaming controller 110.

Figure 3:
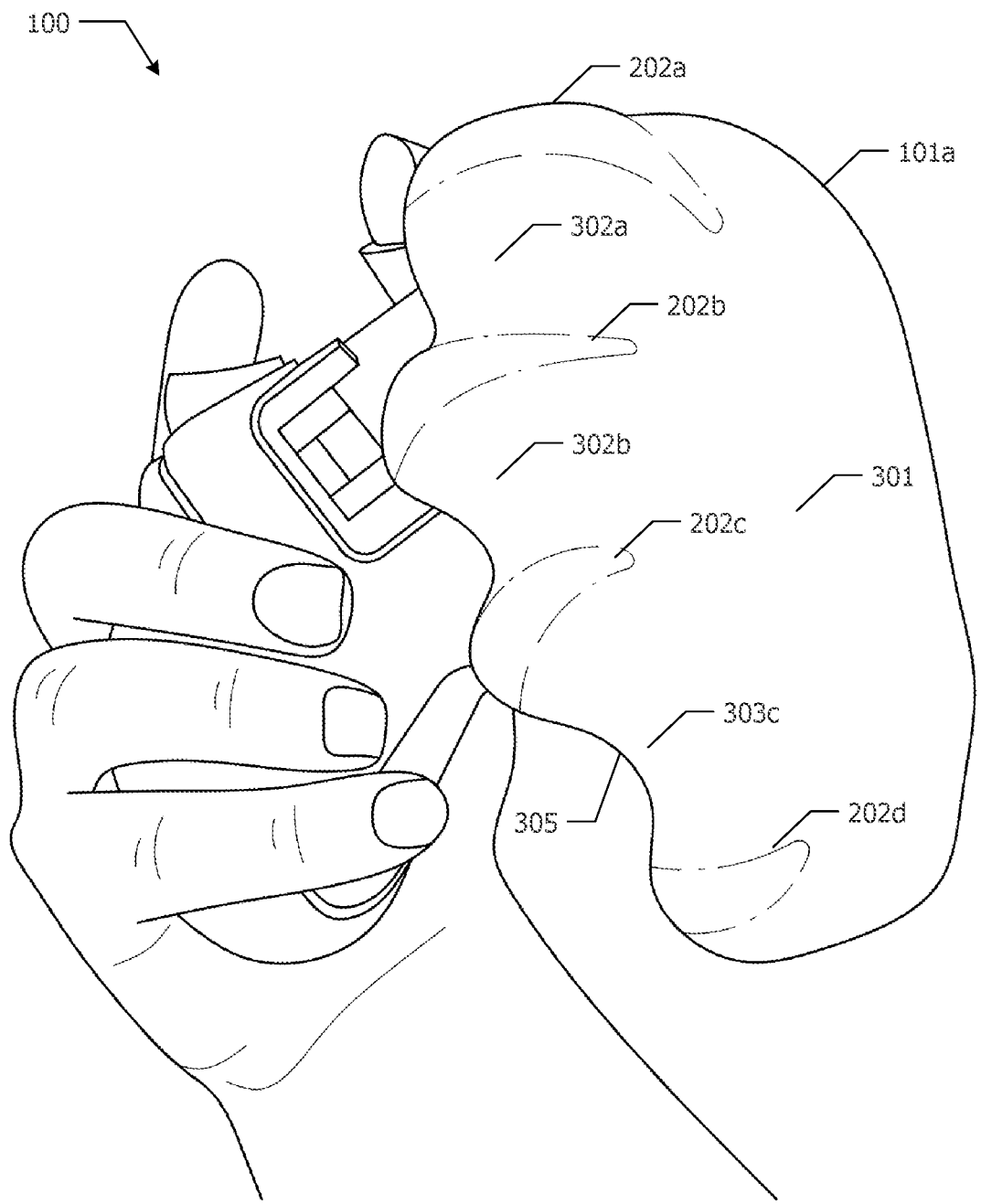
FIG. 3 illustrates use of an article of manufacture providing game controller removable handles according to the present invention
Figure 4:
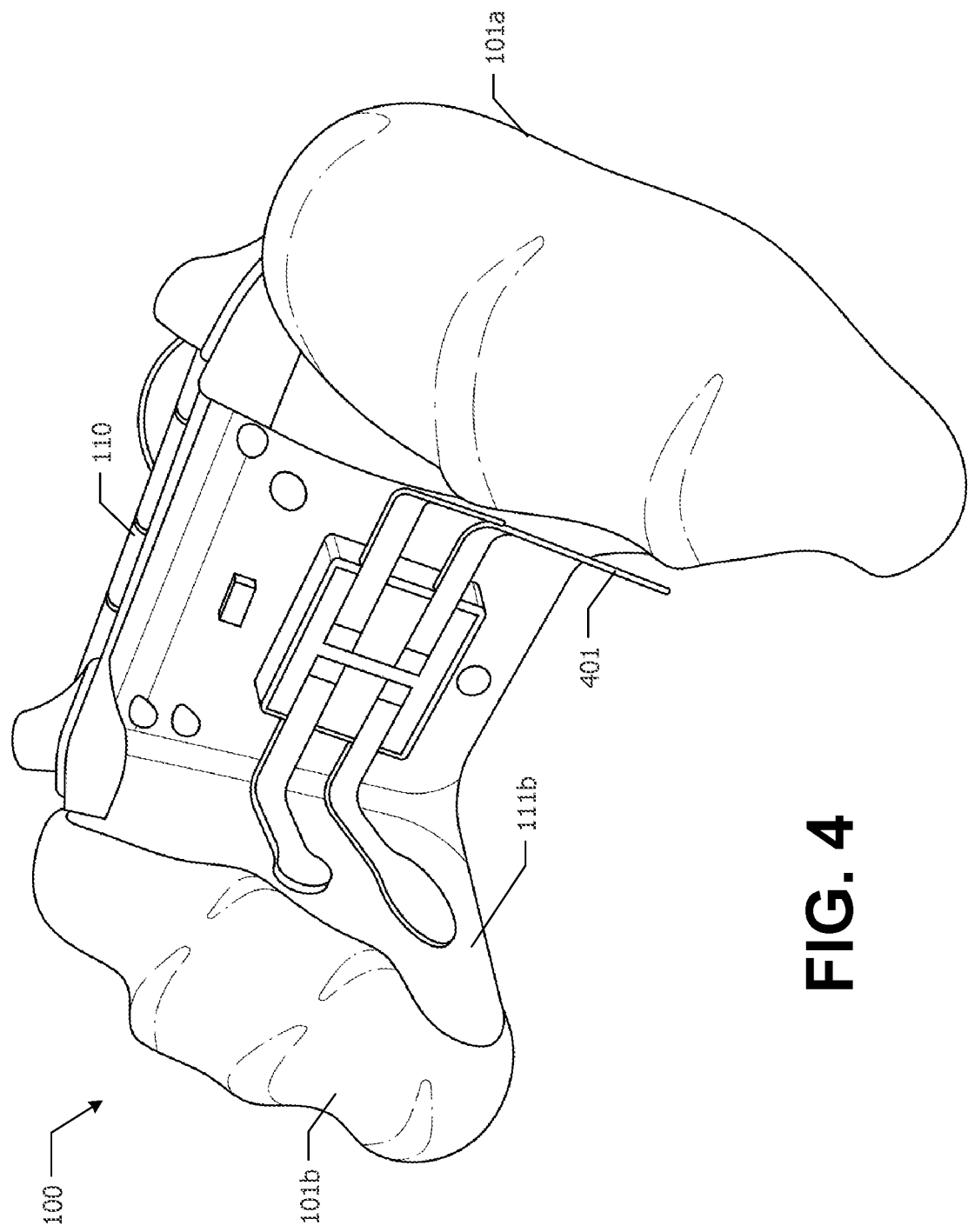
FIG. 4 illustrates a rear view of the article of manufacture providing game controller removable handles according to the present invention.

FIG. 3 illustrates use of an article of manufacture providing game controller removable handles according to the present invention. FIG. 4 illustrates a rear view of an article of manufacture providing game controller removable handles according to the present invention. Each of the removable handles 101a-b is shaped to provide a comfortable grip. An outer surface 301 of the removable handles 110a-b provides a curved surface around which a user's fingers may be positioned while the outer surface 301 engages a palm of a user's hand. Each of the removable handles 101a-b may comprise a set of raised ridges 202a-d positioned to run from an outer curved edge 305 toward the center of the outer surface 301.

Between the set of raised ridges 202a-d a corresponding set of finger grooves 302a-c may be included to provide a concave surface between the set of raised ridges 202a-d that may be sized with a diameter matching a user's fingers. A user may place the outer 3 fingers around the removable handles 101a-b and within the set of finger grooves 302a-c while allowing an index finger to be positioned over a top edge of the removable handles 101a-b and the thumb to be freely positioned along the front surface of the gaming controller 110. The user's fingers may reach around the curved edge 305 of the removable handles 101a-b to engage control inputs 401 of the gaming controller 110 as shown in FIG. 4.

Figure 5:
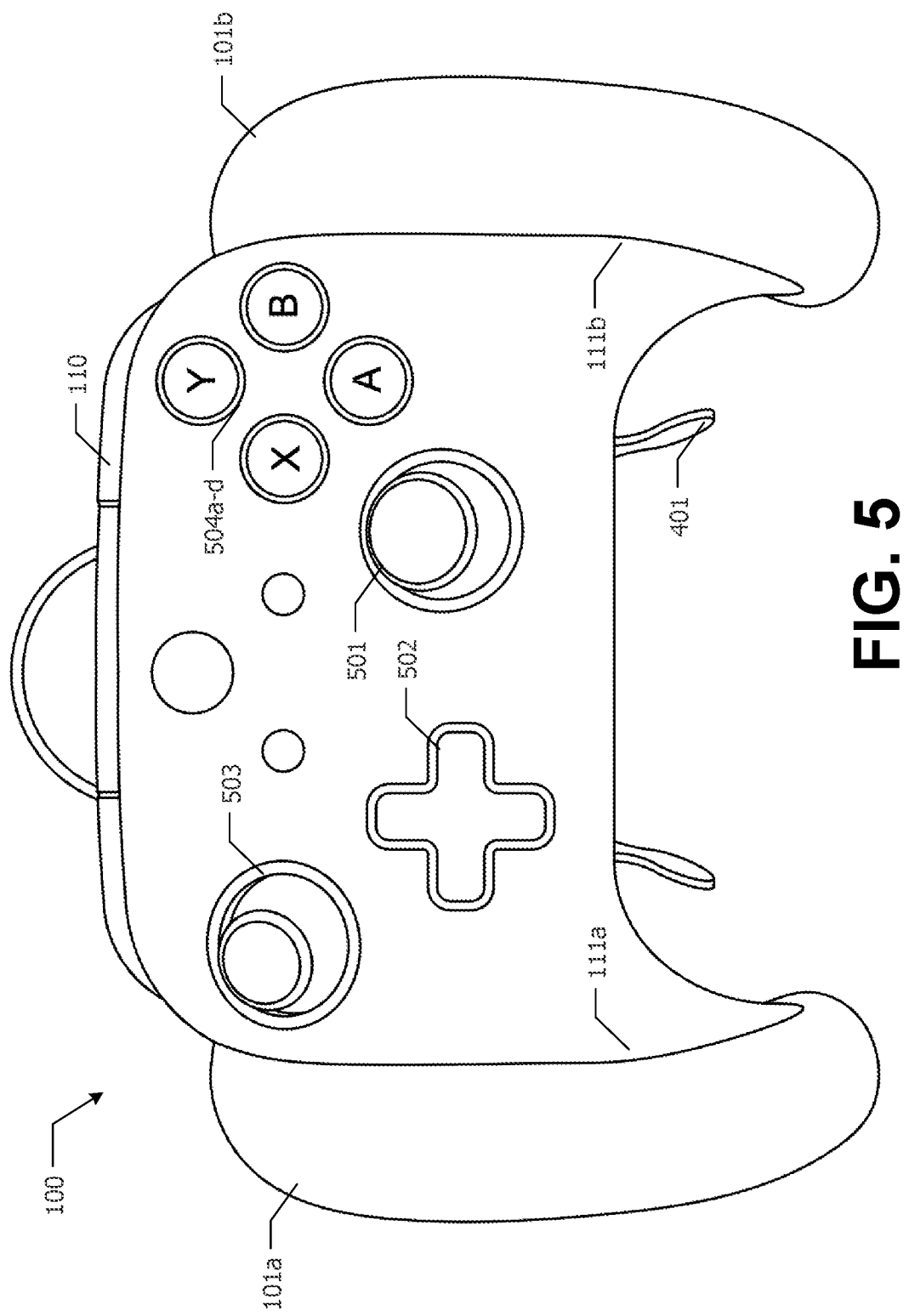
FIG. 5 illustrates a front view of the article of manufacture providing game controller removable handles according to the present invention.

FIG. 5 illustrates a front view of an article of manufacture providing game controller removable handles according to the present invention. The removable handles 101a-b are attached to the gaming controller 110 covering the gaming controller handles 111a-b. The removable handles 101a-b may extend outward and downward from the gaming controller 110 to provide a handle surface that may fit comfortably within the user's hand, against a palm and within the grip of the fingers.

Figure 6:
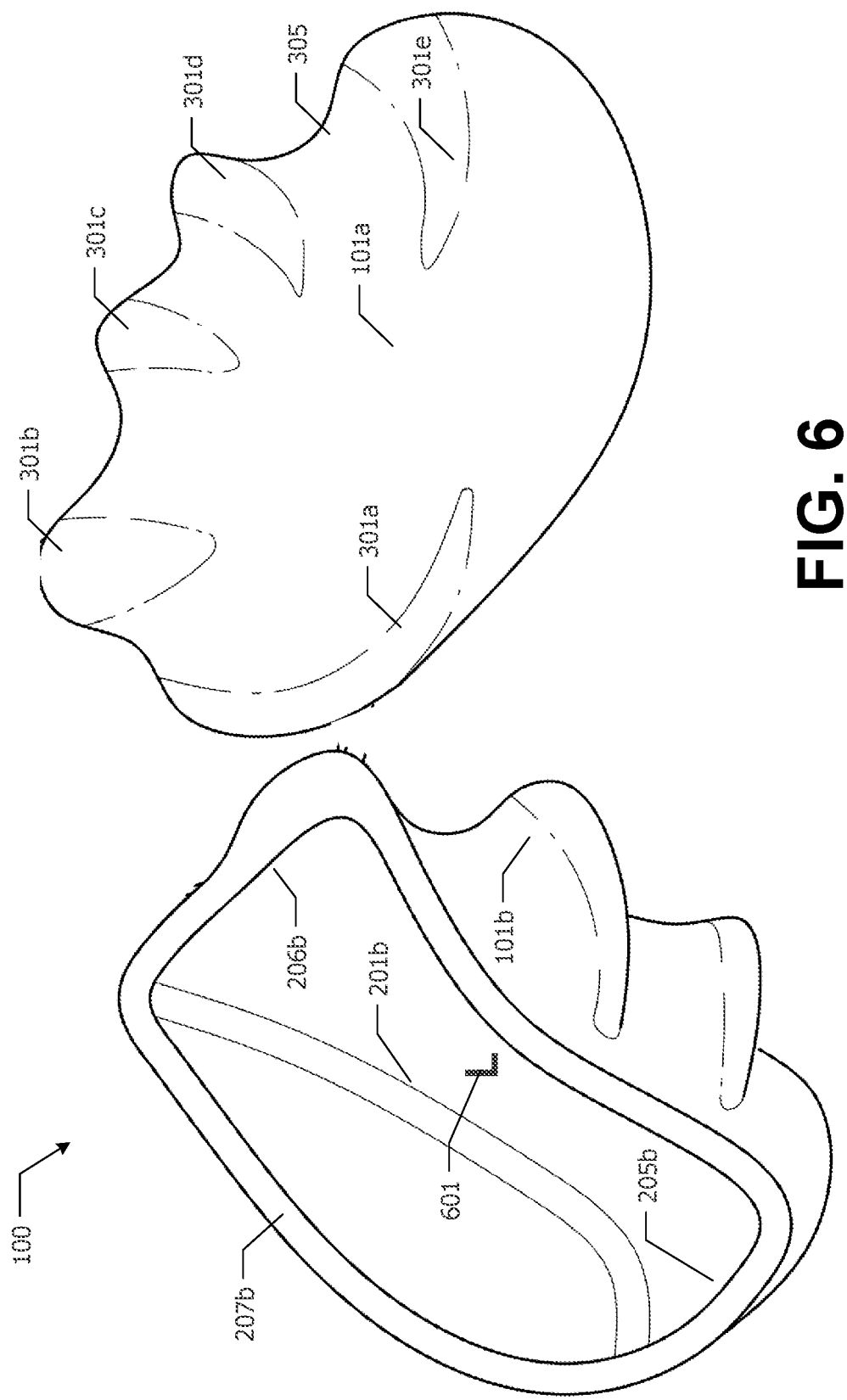
FIG. 6 illustrates outside and inside views of the article of manufacture providing game controller removable handles according to the present invention.

FIG. 6 illustrates outside and inside views of an article of manufacture providing game controller removable handles according to the present invention. The pair of removable handles 101a-b is shown with one of the removable handles 101a showing its outer surface 301a, and a second removable handle 101b showing its inner surface 201b, its wider end 205b, its narrower end 206, and its outer rim 207b. The curved outer edge 305 is shown moving inward and outward around the set of raised ridges 202a-d and the set of finger grooves 302a-c. A character or a word 601 may be added to the inside of each of the handles 101a-b to mark whether a particular handles is to be applied to a left or a right side of the game controller to position the handles 101a-b in a useful orientation.

In a preferred embodiment, the removable handles 101a-b may be made of a flexible material such as silicone. The flexible material may be made of any colored material as desired. Additional items may be imbedded within the silicone material. For example, different colored stones, beads, and other ornamental items may be added to enhance the appearance of the pair of handles 101a-b. The pair of handles 101a-b may also include images, raised markings, and related material in order to add names, character images, and logos from popular video games that may wish to use these handles 101a-b as part of a marketing campaign. The outside surface of the pair of handles 101a-b may possess a smooth surface or may possess a raised texture to aid in gripping the handles as desired.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

The invention claimed is:

1. An article of manufacture providing game controller removable handles, the removable handles comprise:
   a left removable handle; and
   a right removable handle;
   wherein each of the two removable handles comprises:
      an inner surface having a wider inner edge and a narrower inner edge;
      an outer surface having a wider outer edge and a narrower outer edge; and
      a plurality of raised ridges positioned along the outer surface, each of the raised ridges are oriented across the wider outer edge of the outer surface and separated by a distance sufficient to permit fingers to rest between the raised ridges when held;
      a set of finger grooves between each pair of the plurality of raised ridges oriented parallel to the raised ridges;
      wherein the set of finger grooves having a concave surface between each pair of the raised ridges;
      the set of finger grooves being configured to allow an index finger to be positioned over a top edge of the removable handles while a thumb may be freely positioned along the front surface of the gaming controller;
      wherein the set of finger grooves being configured to allow a pinky finger and a ring finger to access paddles on a bottom surface of the gaming controller;
      wherein the curved edge of the removable handles extend around the gaming controllers, but do not interfere with use of the control inputs of the gaming controller;
   wherein each of the two removable handles further comprises:
      a curved outer rim separating the outer surface from the inner surface and being configured to restrain movement of the removable handles when coupled to the game controller;
      wherein the left removable handle and the right movable handle are mirror images of each other;
      wherein the left removable handle is marked along the inner surface with a first character indicating the left removable handle; and
      the right removable handle is marked along the inner surface with a second character indicating the right removable handle.

2. The removable handles according to claim 1, wherein the pair of removable handles are made of a flexible material.

3. The removable handles according to claim 2, wherein the flexible material is silicone.

* * * * *